(12) United States Patent
Murugan et al.

(10) Patent No.: US 8,311,895 B1
(45) Date of Patent: Nov. 13, 2012

(54) REAL-TIME RETURN PROCESSING

(75) Inventors: Chandrasekaran Murugan, Bothell, WA (US); Jeffrey B. Maurer, Issaquah, WA (US); Nicholas J. Morren, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 55 days.

(21) Appl. No.: 12/826,899

(22) Filed: Jun. 30, 2010

(51) Int. Cl.
*G06Q 30/00* (2012.01)
(52) U.S. Cl. ....... 705/26.1; 705/27.1; 705/330; 705/346
(58) Field of Classification Search ................. 705/26.1, 705/27.1, 330, 346
See application file for complete search history.

(56) References Cited

U.S. PATENT DOCUMENTS

| | | | |
|---|---|---|---|
| 6,536,659 B1* | 3/2003 | Hauser et al. | 235/375 |
| 2002/0032612 A1* | 3/2002 | Williams et al. | 705/26 |
| 2003/0225625 A1* | 12/2003 | Chew et al. | 705/24 |
| 2010/0010918 A1* | 1/2010 | Hunt | 705/27 |

OTHER PUBLICATIONS

Rukman Senanayake, Grit Denker, and Jon Pearce, Towards Integrated Specification and Analysis of Machine-Readable Policies Using Maude1, ISWC2005 Semantic Web and Policy Workshop, p. 128-135, Nov. 7, 2005 135.*

* cited by examiner

*Primary Examiner* — Sarah Monfeldt
(74) *Attorney, Agent, or Firm* — Lee & Hayes, PLLC

(57) ABSTRACT

Techniques and systems provide real-time return processing before a retailer receives a returned item, such as during a return process where the retailer (seller) and customer (buyer) are separated from one another (e.g., electronic commerce, etc.). The retailer may collect information about the order and items to be returned from the remotely located customer. The retailer may optionally confirm an identity of the customer such as by verifying the original payment type and/or payment instrument number. The customer may provide collateral in exchange for the real-time return of a refund or an exchange. The retailer may then provide shipping details, calculate the refund (if applicable), and finalize processing. If the retailer does not receive the item in the allotted time for the return (e.g., for ground transport, etc.), then the retailer may charge the customer a value of the item using the collateral.

16 Claims, 8 Drawing Sheets

REAL-TIME RETURN PROCESSING

BACKGROUND

Many retailers customarily offer product return services to their customers. When the retailer has a brick and mortar location, the customer typically presents the product (or portion thereof) to a representative during a visit to the retailer's location. The representative then processes the transaction while the customer is present. Often, the representative asks the customer for a receipt, payment card, and/or personal identification (e.g., driver's license, etc.). After completing the transaction, the representative takes the returned item and issues a refund or exchange. The refund is typically of the same form as the payment type, such as a cash return for a cash purchase or a credit card refund for a credit card purchase. In this scenario, the arm's length transaction enables the retailer to reimburse the customer at the time of the exchange because the retailers gain possession of the returned item. However, when the retailer has no physical location (or it is otherwise difficult for the customer to be present), such as in electronic commerce or telephone order settings, the return process often involves a significant delay before the customer receives a refund. This delay can be unfavorable for both the retailer and the customer. For example, the customer may have to wait days or weeks for the refund while the retailer may lose goodwill of the customer.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to techniques and systems to provide real-time return processing before a retailer receives a returned item. For example, the return process may involve an item purchased using electronic commerce (e-commerce), a telephone order system, mail order, or by other processes where the retailer (seller) and user (buyer) may be physically separated from one another. The retailer may collect information about the order and items to be returned from the remotely located user. In some instance, the retailer may optionally confirm an identity of the user such as by verifying the original payment type and/or payment instrument. The user may provide collateral in exchange for the real-time return of a refund or an exchange. The retailer may then provide shipping details, calculate the return value and finalize processing. If the retailer does not receive the item in the allotted time for the return (e.g., for ground transport, etc.), then the retailer may charge the user a value of the item using the collateral.

The techniques and systems described herein may be implemented in a number of ways. Example implementations are provided below with reference to the following figures.

Illustrative Environment

Figure 1:
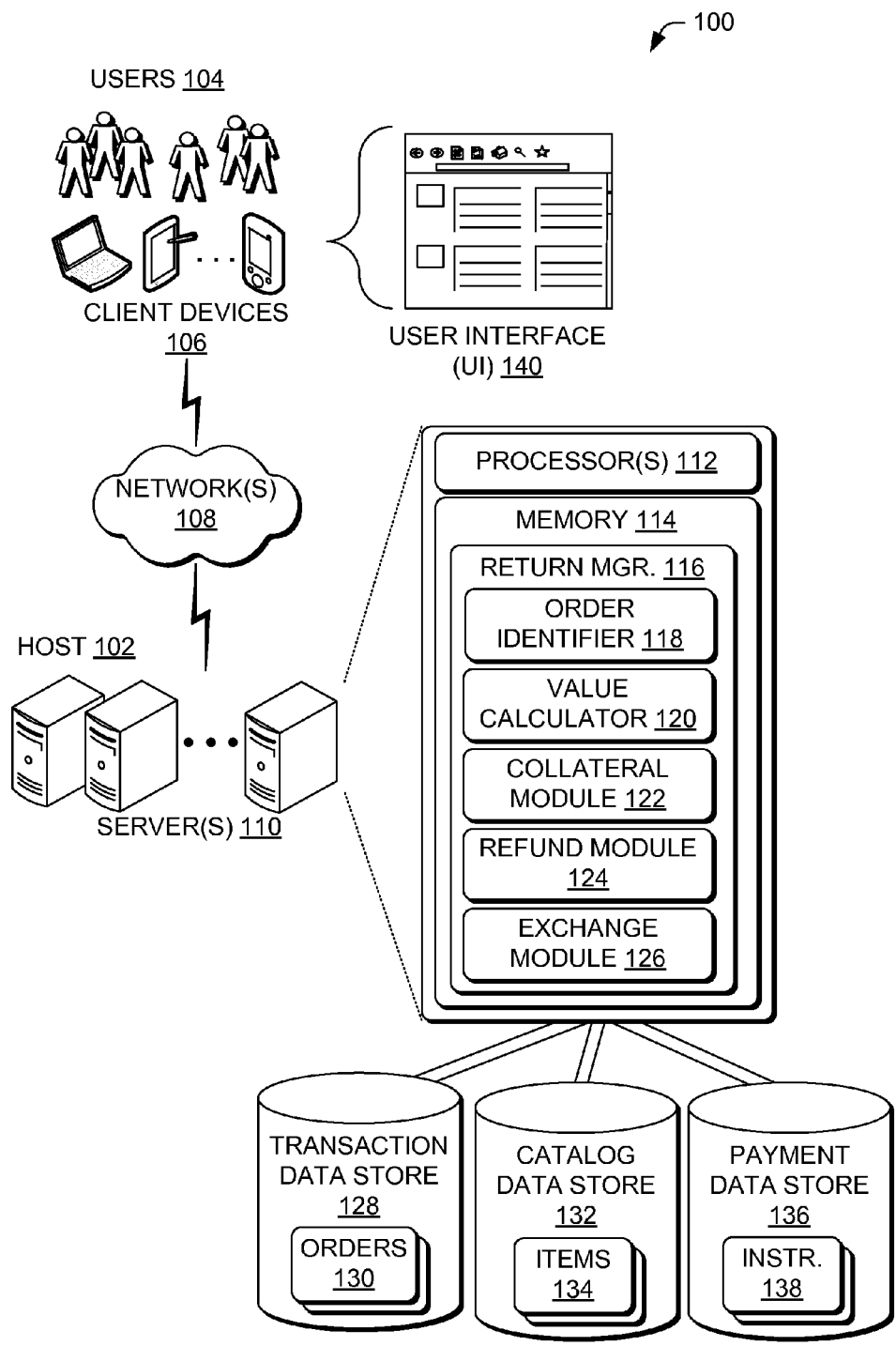
FIG. 1 is a schematic diagram of an illustrative computing environment to provide real-time return processing of items.

FIG. 1 is a schematic diagram of an illustrative computing environment 100 to provide real-time return processing of items. The environment 100 may include a host 102 to employ real-time return processing that enables users 104 to receive a refund or generate an exchange prior to receipt of a returned item. The host 102 may be a retailer, merchant, seller, or other entity that allows a return of an item from a user. The item may be any tangible or non-tangible item capable of being returned, at least in part. A non-exhaustive list of items may include durable goods (such as electronic equipment, hardware, toys, games, books, groceries, etc.), non-durable goods (such as groceries, cleaning products, office supplies, personal products, clothing, etc.), or services (e.g., pre-paid professional services supported by a certificate, etc.).

In various embodiments, the host 102 may be in communication with one or more client devices 106 ("clients") through network(s) 108. The clients 106 may enable the users 104 to interact with the host 102, such as to process a return of an item. The clients 106 may include a personal computer, an electronic book reader (e-book reader), a tablet computer, a mobile telephone, a personal digital assistant (PDA), a television, a set top box, a gaming console, or another electronic device.

The host 102 may perform various operations by processing, via servers 110, returns of items included in transactions. To perform these functions, the server(s) 110 may include processor(s) 112 and memory 114. The memory 114 may be used to store various components, such as applications, modules, and/or data. In various embodiments, a return manager 116 may have components that include an order identifier 118, a value calculator 120, a collateral module 122, a refund module 124, and an exchange module 126.

In some embodiments, the server(s) 110 may be in communication with data stores. The data stores may include a transactional data store 128 that stores orders 130, a catalog data store 132 that stores an arrangement (e.g., hierarchy, etc.) of items 134 in a catalog, and a payment data store 136 that stores payment instruments 138 used in the orders 130 or otherwise stored in association with the users 104.

Returning to the components of the return manager 116, the order identifier 118 may be used to identify an item previously purchased and eligible for a return. The order identifier 118 may query the transactional data store 128 to find a matching order from the orders 130. The matching order may include one or more of the items 134 stored in the catalog data store 132. The order identifier 118 may also retrieve pricing information from the transaction data store 128. In some embodiments, the order identifier 118 may verify an identity of the user that initiates the return, such as by using information stored in the payment data store 136.

The value calculator 120 may calculate an estimated return value associated with an item to be returned using the real-time return processing. The value calculator 120 may receive information from the user about the item, such as a condition of the item (e.g., new, unopened, used, etc.), which may be used to calculate the value of the item. The value calculator 120 may also include additional factors in a calculation of the estimated return value, such as shipping charges, tax, depreciation, and so forth. The value calculator 120 may also calculate the value of a returned item once it is physically received by the host 102.

In some embodiments, the collateral module 122 may be used to secure collateral from the user prior to providing a real-time refund or an exchange. The collateral module 122 may receive and/or verify a payment instrument, such as a valid credit card number, bank account number, etc., as collateral, which may be charged if a balance is due from the user during the processing of the return or exchange. For example, when the user fails to mail the item back to the host 102 in the return process, then the collateral may be used to recuperate the value of the missing item. The collateral may be secured by receipt of an account number and other validation numbers of a bank account (e.g., checking or savings account), a credit card, another financial services account, or other type of account that can be used as collateral.

The refund module 124 may process a refund when the user desires to be reimbursed for a cost associated with the item. The refund module 124 may determine available payment instruments that may be used to issue the refund. For example, the refund module 124 may electronically refund the estimated return value to a payment instrument used to purchase the item in the original order, an electronic gift card, or some other payment instrument. The refund may be issued in money, credits, or other consideration.

The exchange module 126 may process an exchange prior to receiving the item when the user desires to select another item or items in exchange for the originally purchased item. The exchange module 126 may identify items eligible for an exchange. In some embodiments, the exchange module 126 may identify similar items and other related or unrelated items that may be eligible for the exchange. In some embodiments, the refund module 124 and the exchange module 126 may be deployed together to provide both a partial refund and one or more exchange items to the user during the real-time return process.

In accordance with one or more embodiments, one of the clients 106 may cause the display of a user interface (UI) 140 to enable a respective user to interact with the return manager 116. For example, the user may communicate with the host 102 via the user interface 140 on the client device 106 to process a returned item from the orders 130 and receive a refund prior to sending the item back to the host 102.

Illustrative Operation

Figure 2:
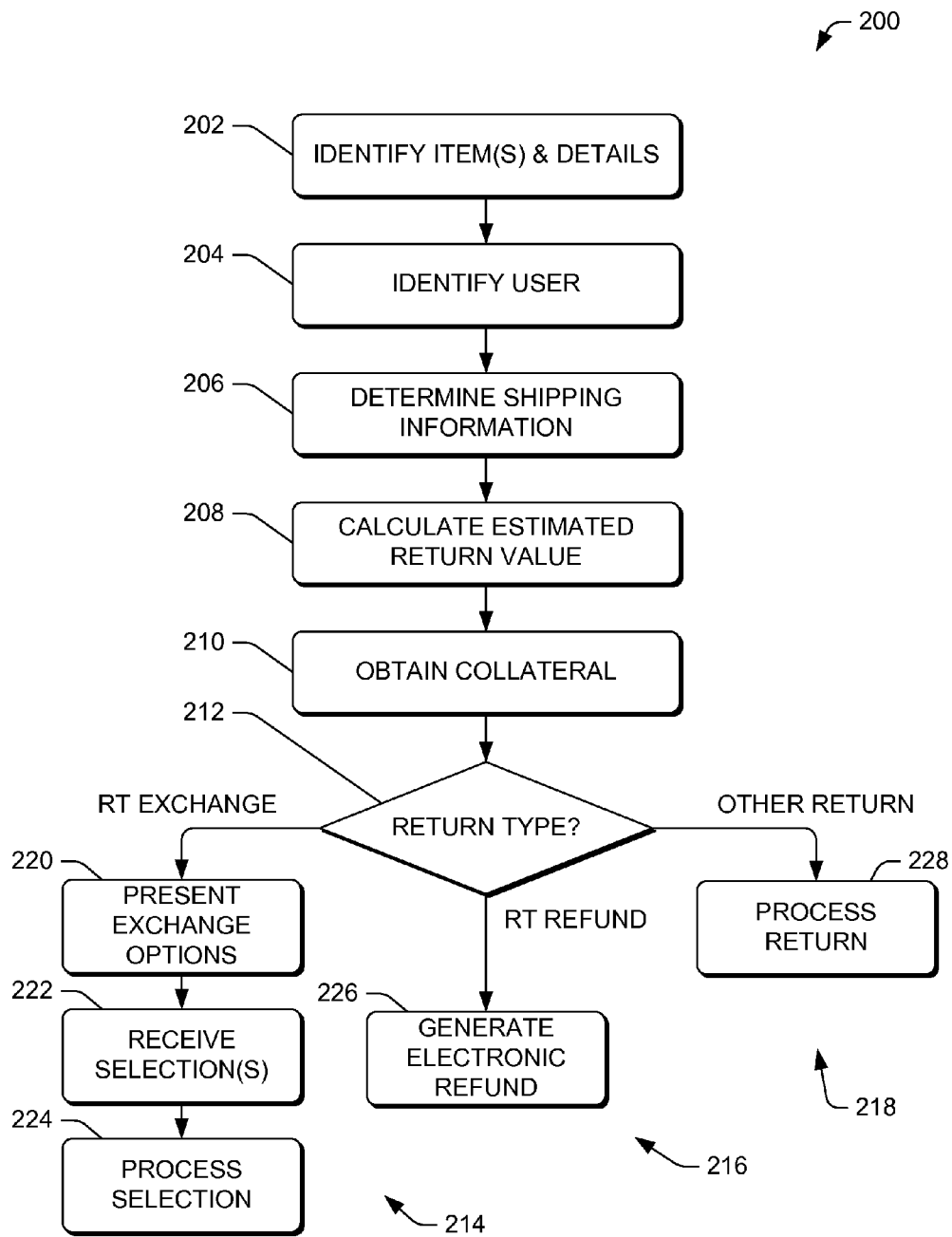
FIG. 2 is a flow diagram of an illustrative process to provide real-time refunds and exchanges to users prior to receipt of the returned item(s) by the user.

FIG. 2 is a flow diagram of an illustrative process 200 to provide real-time refunds and exchanges to users prior to receipt of the returned item(s) by the user. The process 200 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure in FIGS. 3-6, in addition to the process 200, shall be interpreted accordingly. The process 200 is described with reference to the return manager 116 of FIG. 1.

At 202, the order identifier 118 may identify items that may be returned in a real-time return process. In some embodiments, the order identifier 118 may receive an order number (e.g., transaction number, etc.) that links the order to the items purchased during a transaction. The order identifier 118 may query the orders 130 stored in the transaction data store 128 to identify the items of the order. The items may be made selectable by the user to initiate a return. In various embodiments, the user may provide details for each item, such as reasons for the return, quantity to return (when applicable), a condition of the item, comments, and so forth. Some of information may or may not be available depending on the type of item or responses captured in various data fields.

At 204, the order identifier 118 may optionally identity the user making the return. For example, the order identifier 118 may ask the user to input information specific to the order, such as the payment account number, to verify that the user was involved in the initial order and/or as a fraud/risk management process. The order identifier 118 may match information from the payment data store 136 to verify the user.

At 206, the return manager 116 may determine shipping information. The shipping information may include a predetermined date and/or time the item is due to be received or sent to the host 102. The shipping information may also determine a value of the shipping, which may be charged against the user or credited to the user in whole or in part based on a return policy. In some embodiments, the return manager 116 may generate shipping labels to assist the user in returning the item.

At 208, the value calculator 120 may calculate an estimated return value for the item(s) to be returned based in part on the details received at the operation 202 (e.g., condition of item(s), etc.), the shipping information from operation 206, and/or other information such as the duration of the user's possession of the items or other relevant factors that may influence the value of the items in the return process (e.g., the number of the items that the user has previously returned, potentially within a predefined time period). For example, the host may calculate a depreciation value of the item such that an item returned after a month may be refunded for a greater amount (more money) than an item returned after a year of possession by the user assuming both items have similar details (e.g., condition, etc.).

At 210, the collateral module 122 may obtain collateral from the user. The collateral may be a payment instrument such as a credit card instrument, that the host 102 may draw funds from up to the value of the estimated return value. By obtaining the collateral, the host may be assured in recovering the item or the value of the item (e.g., up to the estimated return value) when the host and user engage in a real-time return process. The user may then receive a refund or generate an item exchange prior to return the item involved in the real-time return process. The collateral may charged, or otherwise transferred at least in part to the host 102 when the user fails to return the item, when the returned item's value is less than an estimated value, or for other stipulated reasons. The collateral module 122 may allow the user to select the payment instrument used in the original transaction when the payment instrument is still valid. The user may also have an option to input another payment instrument as collateral. The collateral module 122 may then perform a verification process to make sure the payment instrument is valid, has adequate funds and/or credit limit, and so forth.

At 212, the return manager 116 may determine the type of return that the user would like to conduct in the real-time return process. The types of return may include a real-time (RT) exchange 214, a real-time (RT) refund 216, and/or other returns 218 (such as a replacement, traditional return, traditional exchange, and so forth).

When the return manager 116 receives the RT exchange request, the exchange module 126 may perform operations 220, 222, and 224 to enable the user to proceed with the real-time (or expedited) exchange 214 prior to sending the item of the return to the host. At 220, the exchange module 118 may present exchange options to the user, such as items available for the exchange. The items available for the exchange may include items of a similar family (e.g., different size/color items, but same basic item, etc.), related items (e.g., item with different design but same price, etc.), and/or other designated items. For example, the items available for the exchange may be identified by traversing a hierarchy of the items 134 in the catalog data store 132 to identify a parent-relation of the returned item (e.g., class, subclass, etc.), and then selecting items that share the parent-relation (i.e., selecting the child-relation items). In some embodiments, other items may be available in the exchange options such as promotional items, items the user has interacted with (e.g., in the user's shopping cart, desired list, etc.), and so forth. At 222, the exchange module 118 may receive selection (s) from the user for item(s) to be included in the exchange. At 224, the exchange module 118 may process the selection(s) to initiate shipment of the selection(s) to the user possible prior to receipt of the returned item from the user.

When the return manager 116 receives the refund request, the refund module 126 may generate an electronic refund at 226 to initiate the real-time refund 216 prior to sending the item of the return to the host. At 226, the refund module 124 may transmit the refund to the user. The refund may be transmitted electronically or via traditional techniques (e.g., mail). In some embodiments, the refund module 124 may issue the refund to the user as a gift card (i.e., electronic merchant gift card). The refund module 124 may generate the gift card during the time of the refund or some other time before the return item is received from the user.

When the return manager 116 receives the other refund request, the other refund 218 may be performed at 228 using conventional processing techniques. For example, when the user does not have collateral to complete the operation 210, then the user may be required to use the other return process at the operation 228. The return process 228 may require receipt of the returned item before the user is reimbursed (refunded) for the item.

Figure 3:
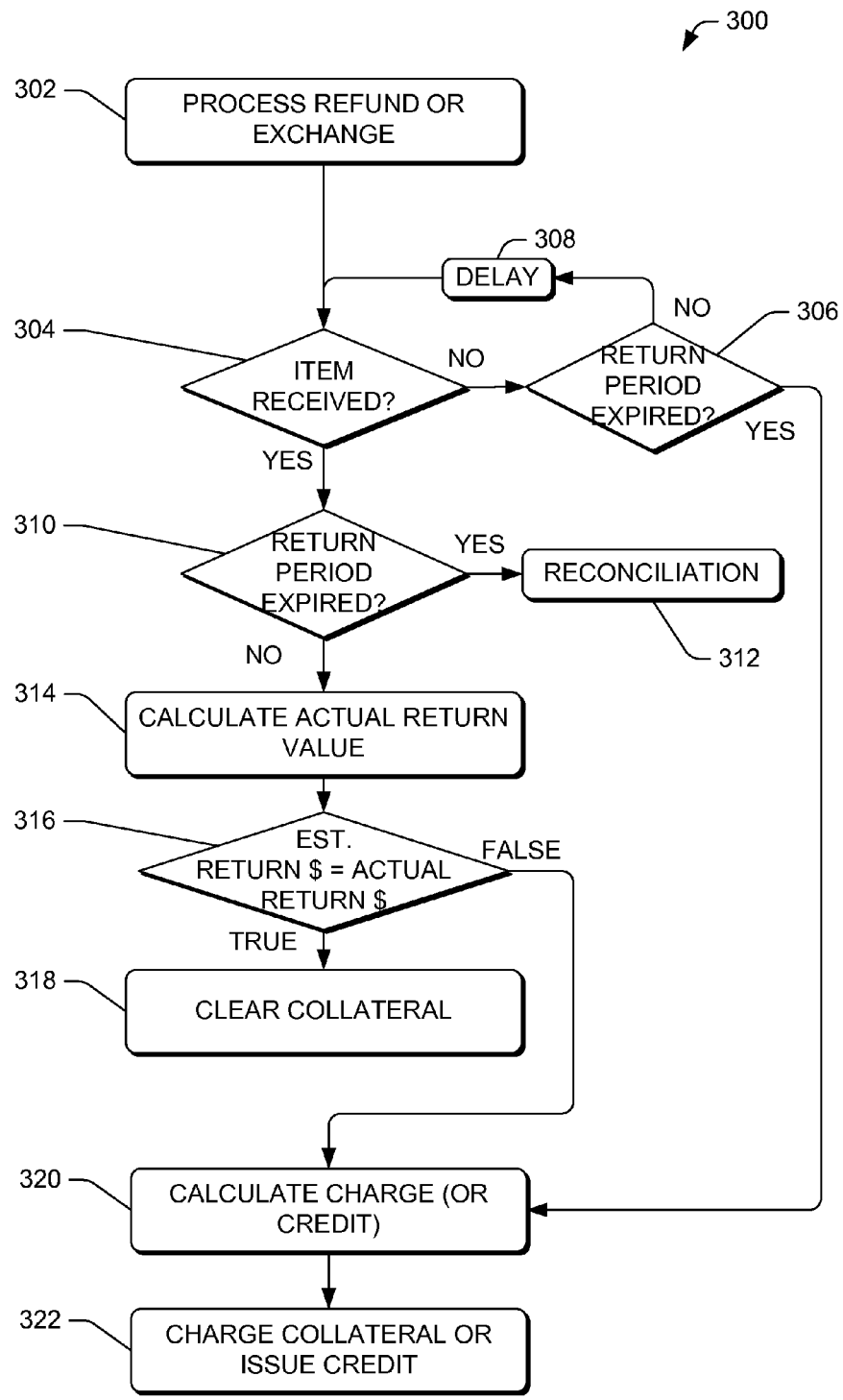
FIG. 3 is a flow diagram of an illustrative process to charge a user's collateral after a real-time refund or exchange of returned item(s) by the user.

FIG. 3 is a flow diagram of an illustrative process 300 to charge a user's collateral after a real-time refund or exchange of returned item(s) by the user. The process 300 is described with reference to the return manager 116 of FIG. 1.

At 302, the return manager 116 may process the real-time refund 216 or real-time (expedited) exchange 214 as using the process 200 shown in FIG. 2.

At 304, the return manager 116 may determine whether the item is received. If the item is not received, the return manager 116 may determine whether the return period has expired at 306. If the return period has not expired, a loop that includes a delay 308 may cycle until either the item is received ("yes" at decision operation 304) or the return period expires ('yes" at decision operation 306).

When the item is received ("yes" at decision operation 304), the return manager 116 may determine whether the return period has expired at 310. When the return period has expired, such as when the item is received after an agreed upon return period, then the return manager 116 may conduct a reconciliation process at 312. The reconciliation process at 312 may include crediting the user with a partial refund (e.g., via the electronic gift card, etc.), rejecting delivery of the item, returning the item to the user, or another action.

At 314, when the item is timely received as determined at 310, the value calculator 120 may calculate an actual return value. The actual return value may be based on results of a human inspection of the item, such as the condition of the item and other details. The inspection details may be similar to the details supplied by the user and received by the order identifier 118 at the operation 202.

At 316, the return manager 116 may determine whether the estimated return value (from the operation 208 of FIG. 2) is equal to the actual return value calculated at the operation 314. When the estimated return value is equal to the actual return value (decision equals "true"), then the return manager 116 may clear the collateral at 318, such as by deleting a pending billing event. The return manager 116 may also notify the user of the receipt of the item, such as via an email or telephone communication.

When the estimated return value is not equal to the actual return value (decision equals "true"), then the return manager 116 may calculate a charge (or credit) at 320. For example, when the estimated return value is greater than the actual return value because the item's condition upon receipt was "opened/used" and the estimated return value was based on a condition of "new", then a charge may be calculated by the value calculator 120. Conversely, a credit may be calculated by the value calculator when the estimated return value is less than the actual return value.

At 322, the return manager 116 may recoup the amount using the collateral (or issue a credit to the user) at the operation 320. A credit may be issued by providing the user with an electronic merchant gift card, money wired to another account of the user, or the like.

When the item is not received ("no" at the decision operation 304) and the return period has expired ("yes" at the decition 306), then the process 300 may advance to the operation 320 to calculate the charge. For example, the charge may equal the estimated return value, which may then be charged to the collateral at 322. In this way, the host 102 may recover the loss from not receiving the item in the return process by charging the user at least the estimated return value, and possibly other fees (e.g., a penalty, etc.). However, if the item is received at a later point in time (i.e., "yes" at the decision operation 310), then the reconciliation process at 312 may refund a portion of the charged amount from the operation 322 back to the user, such as via a electronic merchant gift card.

Figure 4:
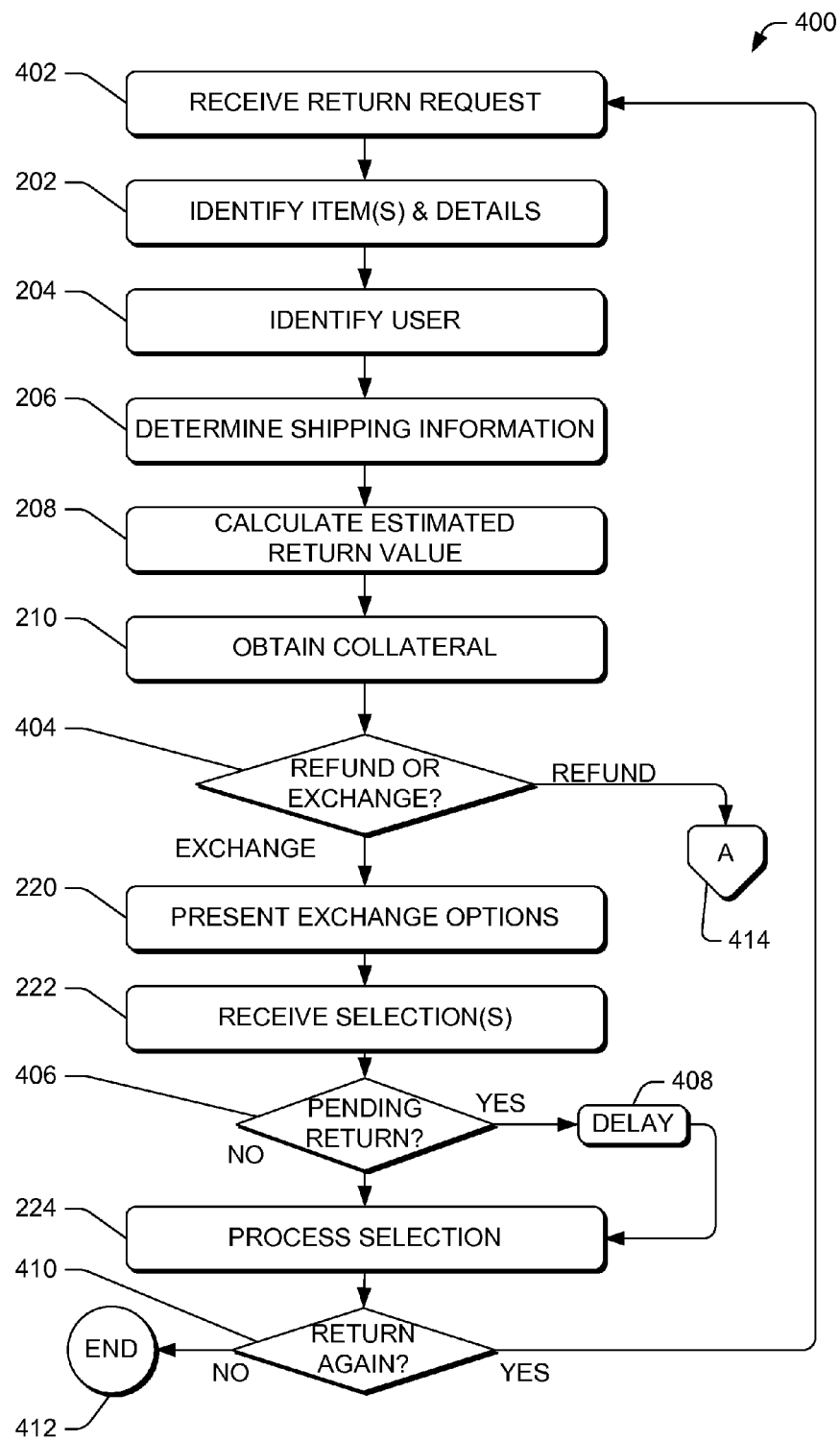
FIG. 4 is a flow diagram of an illustrative process to track multiple exchanges of an item and to enable a refund.

FIG. 4 is a flow diagram of an illustrative process 400 to track multiple exchanges of an item and to enable a refund. The process 400 enables a looping return process, which may enable a user to receive a refund as described in a process 500 (as discussed below). The process 400 is described with reference to the return manager 116 of FIG. 1 and the process 200 of FIG. 2.

At 402, the return manager 116 may receive a request for a return from the user. For example, the user may access a site (e.g., a website, kiosk, call center etc.) to initiate a return. Following the operation 402, the operations 202-210, which are described with reference to the process 200 of FIG. 2, may be performed by the corresponding components of the return manager 116.

At 404, the return manager 116 may determine whether the user requests a real-time return or an expedited exchange. When the user requests an expedited exchange at 404, the exchange may be processed via the operations 220 and 222 of the process 200. The return manager 116 may determine whether a pending return is present at a decision operation 406. For example, the pending return may be present when a user requests the expedited exchange but the host has not received the returned item from the user. In these circumstances, the return manager 116 may be instructed to cause a delay 408 until all (or a predetermined portion) of the items are received by the host 102 (and/or charges are made to the collateral). When there are no pending returns (or less than a predetermined amount by quantity and/or price), possibly following the delay 408, the selections may be processed at 224.

At 410, the return manager may determine whether another return is requested by the user for this item (i.e., the new item received via expedited exchange), which will generally occur at a later point in time and be determined by linking the order number of the transaction (via the transaction data store 128). When no further returns occur, the process 400 may end at 412. When additional returns are present, the process may loop back to the operation 402.

Figure 5:
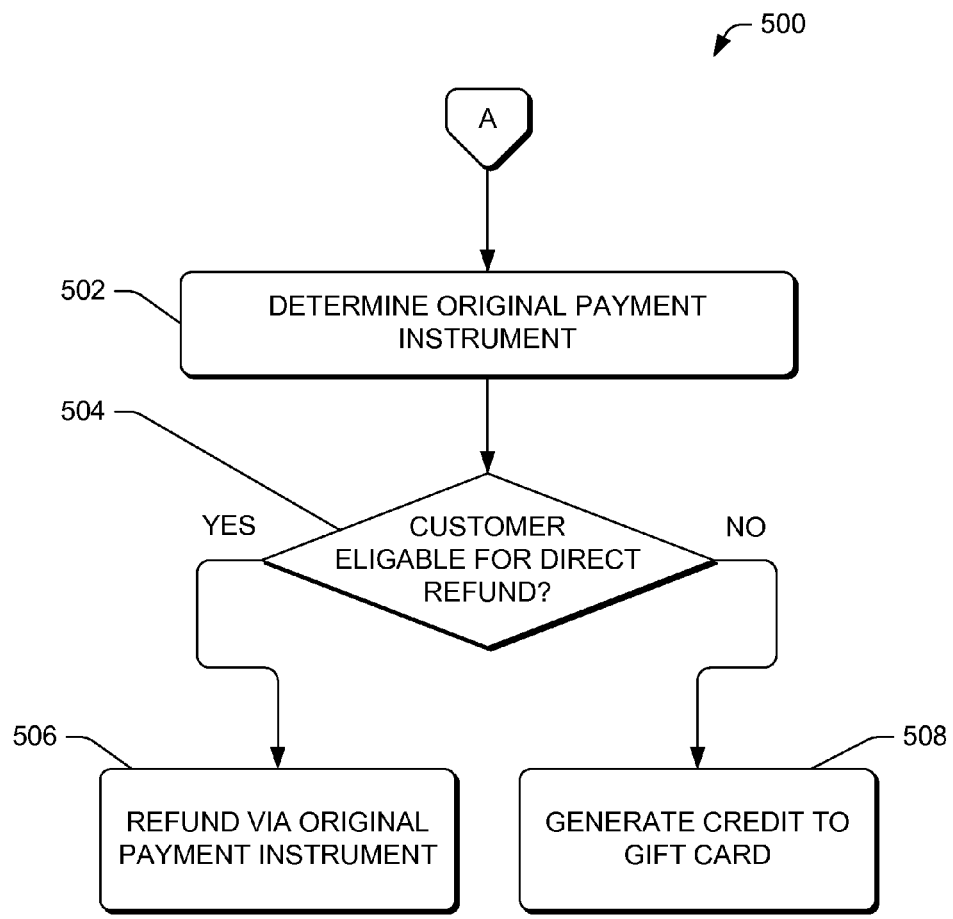
FIG. 5 is a flow diagram of an illustrative process that provides the refund to the user based on the process of FIG. 4.

In accordance with embodiments, the user may request a refund at 404 and, thus, initiate the refund route 414, which is described in detail in the process 500 of FIG. 5. The user may cycle through the loop (via multiply returns at the decision 410). For example, the user may order a first pair of shoes and be dissatisfied with the style and then execute an expedited exchange for a second pair of shoes. The second pair of shoes may not fit properly, and thus the user may decide to seek a refund at 404, which is described next.

FIG. 5 is a flow diagram of an illustrative process 500 that provides the refund to the user based on the process 400 of FIG. 4.

At 502, the return manager 116 may determine the original payment instrument (OPI) used to purchase an item that is initially returned via the process 400. Using the previous example involving the shoes, the OPI may be the payment instrument used to purchase the first pair of shoes.

At 504, the return manager 116 may determine whether the customer is eligible for a direct refund. A direct refund is a credit back to the OPI. For example, the direct refund may be a credit back to a specific credit card used to buy the first pair of shoes. In some instances, the customer may not be eligible for the direct refund. For example, the OPI may no longer be valid (expired, new number, etc.) or the user may have made the purchase using a payment instrument or transaction type that doesn't permit a direct refund. For example, the user may have purchased the first pair of shoes using a coupon or other type of voucher, and so forth. Thus the decision operation 504 may enable the refund module 124 to provide a refund to the user via the OPI in some circumstances.

At 506, the refund module 124 may transmit a credit to the OPI when the OPI qualifies for the direct refund at 504. However, when the OPI does not qualify for the direct refund, then the refund module 124 may generate and issue an electronic merchant gift card for the user to provide the refund at 508. Thus the decision operation 504 may enable the refund module 124 to provide a refund to the user via the OPI in some circumstances.

Figure 6:
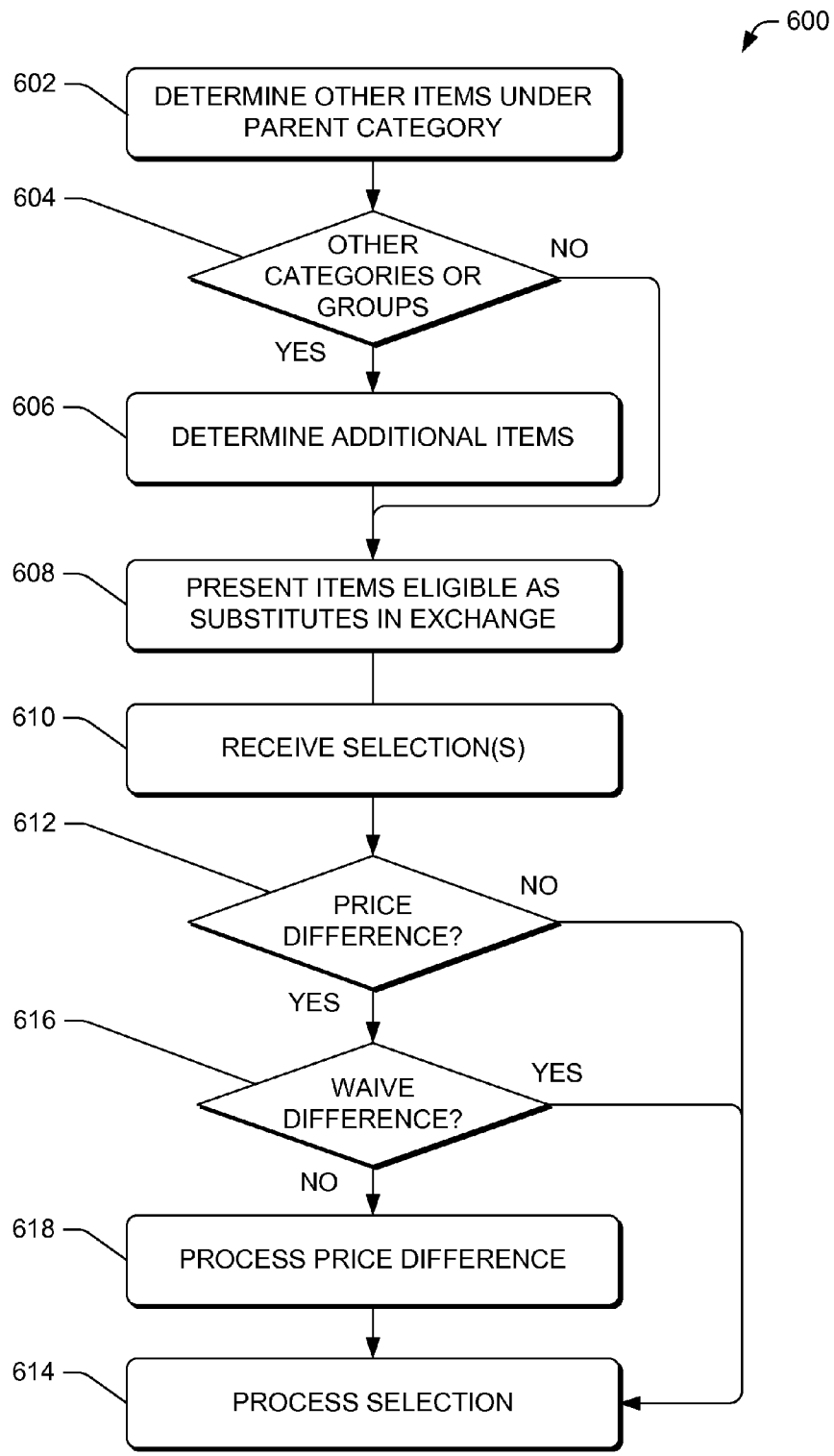
FIG. 6 is a flow diagram of an illustrative process to offer items available for an expedited exchange.

FIG. 6 is a flow diagram of an illustrative process 600 to offer items available for an expedited exchange. The process 600 is described with reference to the return manager 116 of FIG. 1. The process 600 describes item selection using a structured (e.g., hierarchical, etc.) catalog, which is stored in the catalog data store 132. For illustrative purposes, the catalog is discussed as having items associated with categories in parent/child relationships; however other structures or relationships may be used to implement the process 600. The process 600 may be implemented in conjunction with (or as a replacement to) the operations discussed in the expedited exchange 214 in the process 200, and specifically the operations 220, 222, and 224.

At 602, the exchange module 126 may determine or identify other items that are related to the returned item under a parent category. The parent category may be an item category for a specific item (e.g., iPod®, etc.) while the item maybe the music player with specific attributes (red, 10 GB, etc), where the items in the parent category only have minor variations. The parent category may also be general category (e.g., music players, etc.), which include multiple different items (e.g., different brands, features, etc.) that are closely related in price, operation, and so forth.

At 604, the exchange module 126 may determine whether other categories or groups may be used to increase a list of selectable items available for the exchange. For example, the other related parent category may be closely related and designated as a substitute for items in another category. When other categories or groups are determined at 604, the corresponding items may be identified at 606. Otherwise, or after identification of the other items at 606, the process 600 may proceed to 608 where the items are presented to the user as eligible substitutes (in part or in whole) in an exchange of a returned item.

At 610, the exchange module 126 may receive selection(s) from a user of the presented items.

At 612, the exchange module 126 may determine whether the price difference exists between the items selected at 610 and the return item(s). When a price difference exists, then the exchange module continues processing. Otherwise, the exchange module processes the selection at 614.

At 616, the exchange module 126 may determine whether to waive the difference used in the decision operation 612. For example, the user may exchange the first pair of shoes for the second (and different) pair of shoes, which may be slightly more or less expensive. At the decision 616, the exchange module 126 may waive the difference (following "yes" route), and thus continue to process the selection at 614. Alternatively, the exchange module 126 process the price difference at 618 (following the "no" route at 616). When the price difference is processed, the user may have to make an additional payment or may receive a credit (e.g., an amount of the difference via an electronic merchant gift card, etc.) prior to processing the selection at 614. In some embodiments, that user may select additional items via the operation 618 (i.e., another exchange) to make up the difference of the amount rather than receive a credit or refund.

Illustrative Interfaces

Figure 7:
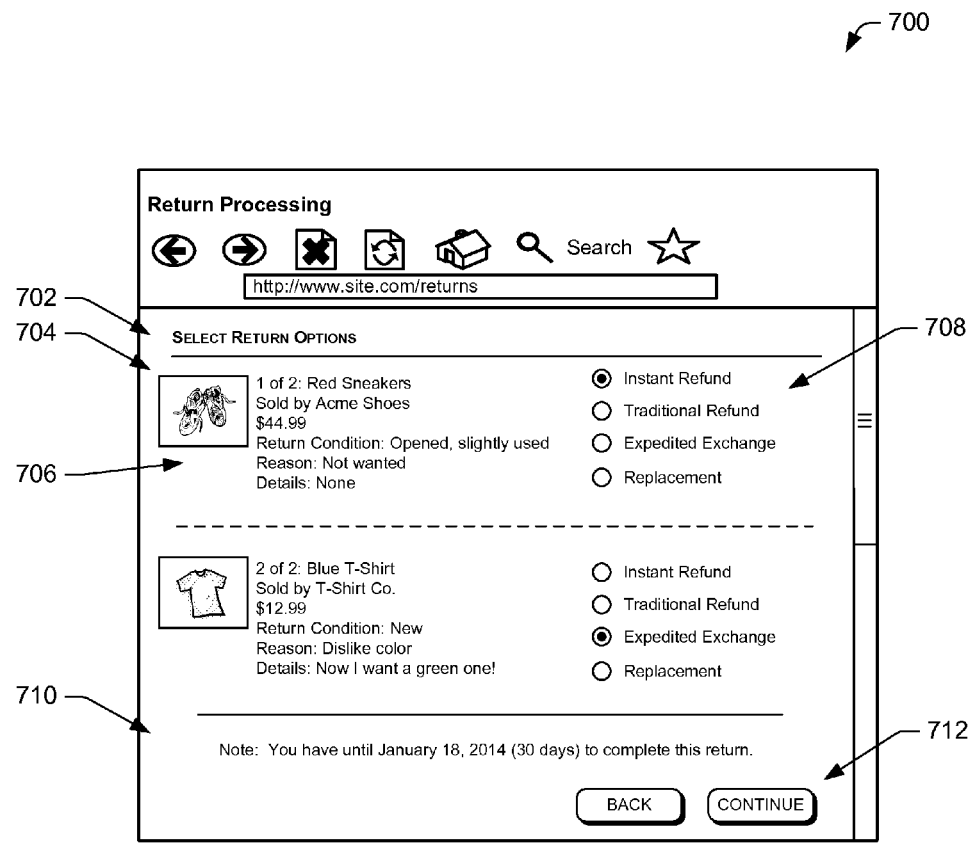
FIG. 7 is an illustrative user interface (UI) to generate a list of items for a real-time return process.
Figure 8:
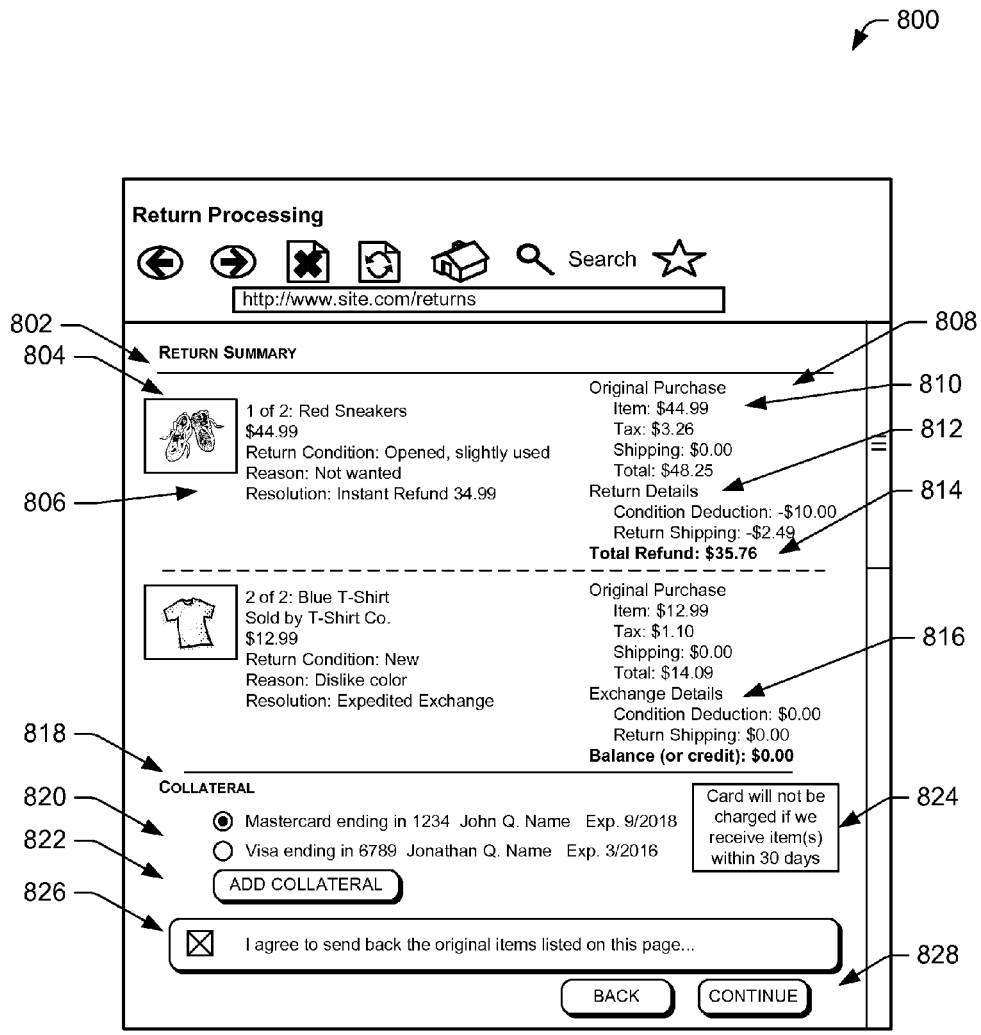
FIG. 8 is an illustrative UI to summarize a return process and allow input and selection of collateral.

FIGS. 7 and 8 show illustrative user interfaces (UI). The UIs are provided as non-limiting examples of interfaces to that may be used to perform some of the operations described with reference to the processes described herein, and in particular, the process 200 of FIG. 2.

FIG. 7 is an illustrative UI 700 to generate a list of items for a real-time return process. The UI 700 includes a return selection portion 502 that may include a list of items in an order or otherwise available for return by a user. For example, a preceding page may request an order number for the user, which may enable populating the UI 700 with items from the order. In some embodiments, the items presented via the UI 700 may be items previously acquired from a seller and/or associated with the user, such as with the user's account number.

An item 704 may include item information 706, which may be designated in part by a user and/or historical information. The item information 706 may include a description of the item, a picture of the item, an original sale price, a return condition, a return reason, other details, and/or a combination of some or all of this information.

For each item, the UI 700 may present return reasons 708. The return reasons may include an instant refund (as disclosed above, such as via an electronic merchant gift card), a traditional refund (via mail, etc.) an expedited exchange (as disclosed above), and a replacement option. The UI 700 may enable a user to select one of the return reasons 708.

In some embodiments, the UI 700 may include a date indicator 710 that indicates a due date for the return of the items. For example, the user may be given thirty days (or another amount of time) to return the item before the user's collateral is charged for failure to return the item (i.e., the operations 320 and 322 of FIG. 3). The date indicator 710 may include a message to inform the user of the due date and/or other relevant information for the return. The UI 700 may include navigation blocks 712 to enable the user to submit information on the UI or navigate to another UI.

FIG. 8 is an illustrative UI 800 to summarize a return process and allow input and selection of collateral. The UI 800 may be presented in response to a selection of "continue" from the navigation blocks of the UI 700.

The UI 800 may include a return summary 802 that lists items in the return. An item 804 may be listed with corresponding return information 806. In accordance with various embodiments, an itemized section 808 may include an original purchase itemized section 810, a return details itemized section 812, and/or a total refund indicator 814. The original purchase itemized section 810 may include an original item price, a charge for taxes and shipping, and a total amount. The return details itemized section 812 may include a condition deduction cost, a return shipping cost, and other costs associated with a return of the item. In some embodiments, the itemized section 808 may include an exchange details itemized section 816 when the UI is processing an expedited exchange for an item. In various embodiments, the UI may enable a user to view more details of the itemized section 808 to see additional information regarding costs, deductions, or other data related to a return of an item.

The UI 800 may include a collateral section 818 to enable the user select collateral 820 and/or add collateral 822. The collateral is charged at operation 322 based on calculations of operation 320 as described above with reference to FIG. 3. A notice 824 may present information to inform the user about use of the collateral. An agreement dialogue box 826 may enable the UI 800 to capture an agreement regarding use of the collateral. The UI 800 may include navigation blocks 828 to enable the user to submit information on the UI or navigate to another UI.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:
   receiving, at a server, a selection of an item from a previous order, the item to be returned by mail in exchange for a real-time refund or an expedite exchange item;
   calculating an estimated return value for the item based at least in part on a condition of the item, the condition of the item being specified by a user and pertaining to whether the item has been used;
   acquiring information associated with a payment instrument from the user as collateral for the real-time refund or the expedite exchange item; and
   providing the estimated return value to the user via at least one of an electronic transfer or a similar item exchange, the providing the estimated return value occurring prior to receipt of the item from the user, wherein the providing the estimated return value is delayed until the receipt of the item when the item is an exchanged item from a previous exchange.

2. The method as recited in claim 1, further comprising verifying an identity of the user prior to the providing the estimated return value.

3. The method as recited in claim 1, wherein the calculating the estimated return value for the item is further based in part on a currency amount of the item as specified in the previous order.

4. The method as recited in claim 1, further comprising:
   determining whether the item is timely received prior to a threshold date after the providing the estimated return value; and
   using the information to charge the payment instrument an amount based at least in part on the estimated return value when the item is not received prior to the threshold date.

5. The method as recited in claim 1, wherein the electronic transfer is a transfer of the estimated return value to an electronically stored merchant gift card associated with the user.

6. The method as recited in claim 1, further comprising:
   determining whether the item is timely received prior to a threshold date after the providing the estimated return value;
   upon the receipt of the item from the user, determining an actual return value of the item based at least in part on a condition of the item as received and the determining whether the item is timely received; and
   using the information to charge the payment instrument a difference between the actual return value and the estimated return value when the actual return value is less than the estimated return value.

7. The method as recited in claim 1, further comprising generating a list of items available for selection for an expedited exchange based at least in part on the item from the previous order.

8. The method as recited in claim 1, further comprising:
   tracking an original payment type of the previous order; and
   offering reimbursement of the original payment type of the previous order to the user subsequent to providing of the expedite exchange item when the user requests a refund of the expedite exchange item.

9. One or more computer-readable storage media storing computer-executable instructions that, when executed on one or more processors, performs acts comprising:
   receiving, at a server, a selection of an item from a previous order, the item to be returned by mail in exchange for a real-time refund or an expedite exchange item;
   calculating an estimated return value for the item based at least in part on a condition of the item, the condition of the item being specified by a user and pertaining to whether the item has been used;
   acquiring information associated with a payment instrument from the user as collateral for the real-time refund or the expedite exchange item; and providing the estimated return value to the user via at least one of an electronic transfer or a similar item exchange, the providing the estimated return value occurring prior to receipt of the item from the user, wherein the providing the estimated return value is delayed until the receipt of the item when the item is an exchanged item from a previous exchange.

10. The one or more computer-readable storage media as recited in claim 9, wherein the acts further comprise verifying an identity of the user prior to the providing the estimated return value.

11. The one or more computer-readable storage media as recited in claim 9, wherein the calculating the estimated return value for the item is further based in part on a currency amount of the item as specified in the previous order.

12. The one or more computer-readable storage media as recited in claim 9, wherein the acts further comprise:
  determining whether the item is timely received prior to a threshold date after the providing the estimated return value; and
  using the information to charge the payment instrument an amount based at least in part on the estimated return value when the item is not received prior to the threshold date.

13. The one or more computer-readable storage media as recited in claim 9, wherein the electronic transfer is a transfer of the estimated return value to an electronically stored merchant gift card associated with the user.

14. The one or more computer-readable storage media as recited in claim 9, wherein the acts further comprise:
  determining whether the item is timely received prior to a threshold date after the providing the estimated return value;
  upon the receipt of the item from the user, determining an actual return value of the item based at least in part on a condition of the item as received and the determining whether the item is timely received; and
  using the information to charge the payment instrument a difference between the actual return value and the estimated return value when the actual return value is less than the estimated return value.

15. The one or more computer-readable storage media as recited in claim 9, wherein the acts further comprise generating a list of items available for selection for an expedited exchange based at least in part on the item from the previous order.

16. The one or more computer-readable storage media as recited in claim 9, wherein the acts further comprise:
  tracking an original payment type of the previous order; and
  offering reimbursement of the original payment type of the previous order to the user subsequent to providing of the expedite exchange item when the user requests a refund of the expedite exchange item.

* * * * *